United States Patent
Dahodwala et al.

(10) Patent No.: US 10,371,071 B2
(45) Date of Patent: Aug. 6, 2019

(54) SYSTEMS AND METHODS FOR NON-INTRUSIVE CLOSED-LOOP COMBUSTION CONTROL OF INTERNAL COMBUSTION ENGINES

(71) Applicant: FEV North America, Inc., Auburn Hills, MI (US)

(72) Inventors: Mufaddel Z. Dahodwala, West Bloomfield, MI (US); Erik Koehler, Birmingham, MI (US)

(73) Assignee: FEV North America, Inc., Auburn Hills, MI (US)

( * ) Notice: Subject to any disclaimer, the term of this patent is extended or adjusted under 35 U.S.C. 154(b) by 237 days.

(21) Appl. No.: 15/346,808

(22) Filed: Nov. 9, 2016

(65) Prior Publication Data
US 2018/0128197 A1 May 10, 2018

(51) Int. Cl.
*F02D 41/14* (2006.01)
*F02D 41/00* (2006.01)
(Continued)

(52) U.S. Cl.
CPC ......... *F02D 41/009* (2013.01); *F02D 35/028* (2013.01); *F02D 41/146* (2013.01); *F02D 41/1445* (2013.01); *F02D 41/1446* (2013.01); *F02D 41/1448* (2013.01); *F02D 41/1454* (2013.01); *F02D 41/1479* (2013.01); *F02D 41/402* (2013.01); *F02D 2041/1433* (2013.01); *F02D 2200/021* (2013.01); *F02D 2200/0406* (2013.01); *F02D 2200/0414* (2013.01); *F02D 2200/0602* (2013.01); *F02D 2200/101* (2013.01); *F02D 2200/1002* (2013.01); *Y02T 10/44* (2013.01)

(58) Field of Classification Search
CPC .... F02D 41/26; F02D 41/402; F02D 41/1479; F02D 35/028; F02D 41/1454; F02D 41/009; F02D 41/1445; F02D 41/1448; F02D 41/146; F02D 41/1446; F02D 2041/1433; F02D 2200/101; F02D 2200/0602; F02D 2200/0406; F02D 2200/021; F02D 2200/1002; F02D 2200/0414
See application file for complete search history.

(56) References Cited

U.S. PATENT DOCUMENTS

8,073,611 B2 * 12/2011 Loeffler ................ F02D 35/028
701/102
9,488,118 B2 * 11/2016 Bresch-Pietri ...... F02D 41/0072
(Continued)

*Primary Examiner* — David Hamaoui
(74) *Attorney, Agent, or Firm* — Dinsmore & Shohl LLP (57) ABSTRACT

Systems and methods for non-intrusive closed-loop control of internal combustion engines are provided. Systems of the non-intrusive closed-loop control of internal combustion engines include a plurality of engine operating condition sensors, an electronic control unit with a Gaussian process model, and a look-up table. The electronic control unit estimates an MFB50 of the internal combustion engine using the Gaussian process model and with engine operating condition data as input. A desired MFB50 is obtained from the look-up table and a command of a control parameter to a fuel injector for the internal combustion engine is executed by the electronic control unit and as a function of the comparison of the estimated MFB50 and the desired MFB50.

18 Claims, 7 Drawing Sheets

(51) Int. Cl.
 *F02D 41/40* (2006.01)
 *F02D 35/02* (2006.01)

(56) References Cited

U.S. PATENT DOCUMENTS

| | | | |
|---|---|---|---|
| 2006/0288979 A1 | 12/2006 | Ancimer et al. | |
| 2009/0182483 A1 | 7/2009 | Loeffler et al. | |
| 2012/0095668 A1 | 4/2012 | Landsmann et al. | |
| 2015/0354493 A1* | 12/2015 | Jung | F02D 35/024 |
| | | | 701/105 |

* cited by examiner

SYSTEMS AND METHODS FOR NON-INTRUSIVE CLOSED-LOOP COMBUSTION CONTROL OF INTERNAL COMBUSTION ENGINES

FIELD OF THE TECHNOLOGY

The present specification generally relates to combustion control of internal combustion engines and, more specifically, to combustion control of internal combustion engines using non-intrusive closed-loop systems and methods.

BACKGROUND

New regulations for exhaust gas emissions for motor vehicles continue to provide challenges for emission and onboard diagnostic (OBD)) compliance. Such regulations require that levels of hydrocarbons (HC), carbon monoxide (CO), and nitrogen monoxide (NO) in exhaust gas exiting an exhaust system of a motor vehicle be below predefined levels set by one or more government agencies and regulations, e.g. the Clean Air Act. There is also a desire to reduce fuel consumption by motor vehicles. Accordingly, a need exists for improved combustion control strategies, systems and methods.

SUMMARY

A non-intrusive closed-loop control system includes an internal combustion engine with a plurality of cylinders, a plurality of engine operating condition sensors configured to sense engine operating conditions of the internal combustion engine, and an electronic control unit (ECU). The ECU may have one or more processors and a non-transitory computer-readable medium storing computer-executable instructions. The computer-executable instructions include a Gaussian process model and the ECU is configured to receive engine operating condition data from the plurality of engine operating condition sensors and estimate a combustion parameter, e.g., crank angle for mass fraction burn of 50% ($MFB50_{est}$), of the internal combustion engine using the Gaussian process model. The ECU is also configured to compare the estimated combustion parameter with a desired combustion parameter, e.g., a desired MFB50 ($MFB50_{desired}$), obtained from an empirically determined look-up table and command a control parameter for a fuel injector for each of the plurality of cylinders of the internal combustion engine as a function of the estimated combustion parameter and desired combustion parameter comparison. The plurality of engine operating condition sensors may provide data on engine operating conditions such as intake manifold temperature, intake manifold pressure, exhaust gas recirculation (EGR) temperature, EGR flow rate, exhaust gas oxygen concentration, exhaust gas NOx concentration, exhaust gas temperature and/or exhaust gas lambda to the ECU for use as input to the Gaussian process model. The engine operating condition sensors may further provide data on fuel injector conditions such as SOI from a previous combustion cycle, fuel injected quantity, energizing time of a fuel injector during a fuel injection pulse, fuel injection pressure, and/or dwell time between consecutive fuel injection pulses for use as input to the Gaussian process model. The control parameter for the fuel injector may include without limitation a start of injection (SOT) for a current combustion cycle, rail pressure for a current combustion, number of injection events for a current combustion cycle and combinations thereof. The comparison of the estimated combustion parameter with the desired combustion parameter may be decoupled from any sensor measurement from within the plurality of cylinders and the internal combustion engine may be void of an in-cylinder pressure sensor. The desired combustion parameter obtained from the empirically determined look-up table may be a function of internal combustion engine speed, internal combustion engine load, and/or internal combustion engine temperature.

A method for controlling fuel injection of an internal combustion engine includes operating an internal combustion engine with an intake manifold, a plurality of cylinders, a fuel injector for each cylinder, an exhaust manifold, a plurality of engine operating condition sensors configured to sense engine operating conditions and an ECU with one or more processors and a non-transitory computer-readable medium storing computer-executable instructions. The computer-executable instructions include a Gaussian process model and the ECU is configured to receive engine operating condition data from the plurality of engine operating condition sensors. The ECU estimates a combustion parameter, e.g., $MFB50_{est}$, of the internal combustion engine using the engine operating condition data as input for the Gaussian process model and a desired combustion parameter, e.g., $MFB50_{desired}$, is obtained from a look-up table and compared with the estimated combustion parameter. The ECU commands a control parameter for the fuel injector of each cylinder as a function of the estimated combustion parameter and desired combustion parameter comparison. The engine operating condition data may include data on engine operating conditions such as intake manifold temperature, intake manifold pressure, exhaust gas recirculation (EGR) temperature, EGR flow rate, exhaust gas oxygen concentration, exhaust gas NOx concentration, exhaust gas temperature and/or exhaust gas lambda. The engine operating condition data may also include fuel injector condition data such as a control parameter for the fuel injector from a previous combustion cycle, fuel injected quantity, energizing time of a fuel injector during a fuel injection pulse, fuel injection pressure, and/or dwell time between consecutive fuel injection pulses.

Additional features and advantages of the apparatuses for holding and retaining glassware during processing described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 2:
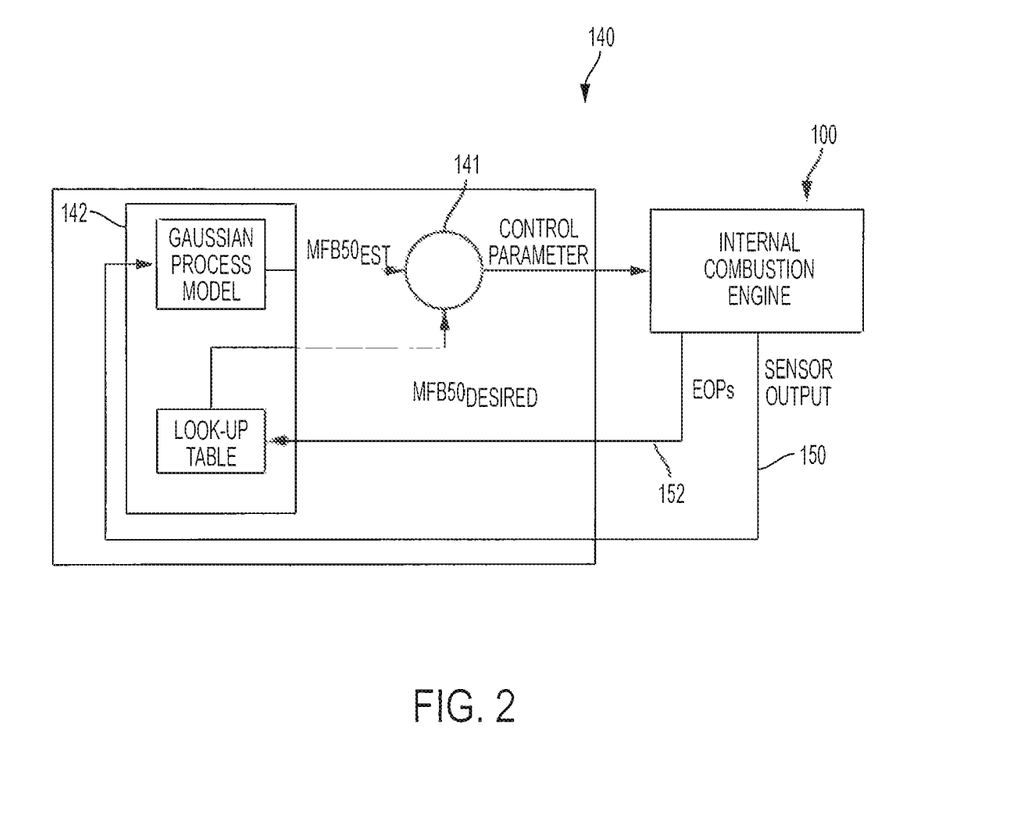
FIG. 2 schematically depicts the system shown in FIG. 1.

Systems and methods for non-intrusive closed-loop control for internal combustion engines are provided. Referring to FIG. 2, an internal combustion engine with a plurality of cylinders and associated fuel injectors has a plurality of sensors that sense and provide data on engine operating conditions (labeled "Sensor Ouput" in the figure) to a Gaussian process model. The Gaussian process model uses the data on the engine operating conditions to calculate and provide an $MFB50_{est}$. Engine operating parameters (labeled "EOPs" in the figure) of the internal combustion engine are used to select an $MFB50_{desired}$ from an empirically determined look-up table (hereafter referred to simply as "look-up table" and also known as a "map"). The $MFB50_{est}$ provided by the Gaussian process model is compared with the $MFB50_{desired}$ selected from the look-up table and a command for a control parameter for one or more fuel injectors associated with one or more cylinders of the internal combustion engine is provided. The comparison of the $MFB50_{est}$ and the $MFB50_{desired}$, and the subsequent fuel injector control parameter command, are decoupled from any measurements from within the one or more cylinders of the internal combustion engine and any sensor output from within the one or more cylinders of the internal combustion engine. Accordingly, the systems and methods disclosed and described herein do not require in-cylinder pressure sensors and/or in-cylinder pressure data. Various embodiments of systems and methods for non-intrusive closed-loop combustion control of internal combustion engines will be described in further detail herein with specific reference to the appended drawings.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise. The term "associated with" refers to a component that is coupled to and necessary for the operation of a different component. The term engine refers to internal combustion engine and ICE.

Figure 1:
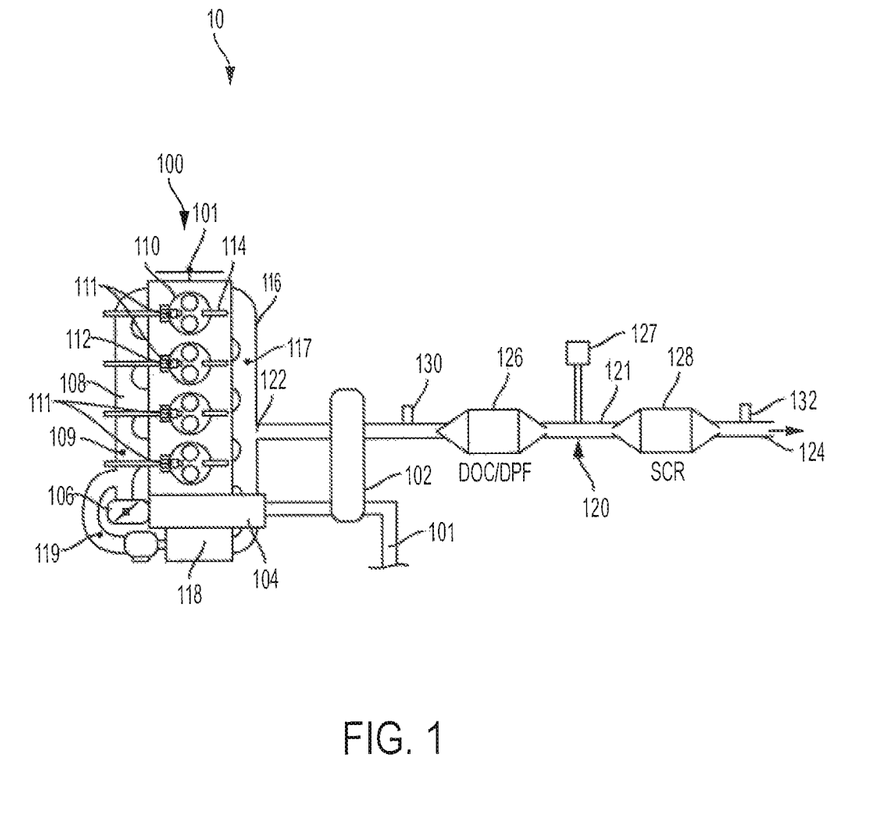
FIG. 1 schematically depicts a system for non-intrusive closed-loop combustion control of an internal combustion engine according to one or more embodiments disclosed and described herein.

FIG. 1 generally depicts a system 10 for non-intrusive closed-loop combustion control of an internal combustion engine (ICE) according to one or more embodiments disclosed herein. The system 10 may include a diesel ICE 100 with an air intake fluidly coupled to a turbocharger 102. The turbocharger 102 provides pressurized air to the diesel ICE 100 through an intercooler 104 and an intake throttle valve 106. The intake throttle valve 106 can adjust the amount of air that enters the diesel ICE 100. The pressurized air can pass through an intake manifold 108 before entering one or more individual cylinders 110. Fuel can be introduced to the individual cylinders 110 through one or more fuel injectors 112 positioned within each cylinder 110. A glow plug 114 may be positioned within each of the cylinders 110 or respective cylinder heads. An exhaust system 120 is included. The exhaust system 120 may include an exhaust manifold 116 and an exhaust pipe 121 with an inlet 122 and an outlet 124. An exhaust gas recirculation (EGR) system 118 that allows at least a portion of exhaust gas to be recirculated through the diesel ICE 100 may be included. The exhaust system 120 may include a diesel oxidation catalyst/diesel particulate filter (DOC/DPF) 126 may be located downstream from the EGR system 118 and a selective catalytic reduction (SCR) catalyst 128 may be located downstream from the DOC/DPF 126. A reducing agent dosing system 127 for injection of a reducing agent into the exhaust system 120 upstream of the SCR catalyst 128 may be included. The reducing agent can be urea, anhydrous ammonia, aqueous ammonia or a combination thereof.

Still referring to FIG. 1, a plurality of engine operating condition sensors may be included. In particular, an engine operating parameter sensor 101, an intake manifold sensor 109, a fuel injector sensor 1, an exhaust manifold sensor 117, an EGR sensor 119, a first NOx sensor 130 can be located upstream of the DOC/DPF 126 and a second NOx sensor 132 can be located downstream from the SCR catalyst 128 may be included. The engine operating parameter sensor 101 may be an engine speed sensor, an engine load sensor, an engine temperature sensor; an engine speed sensor and an engine load sensor; an engine speed sensor and an engine temperature sensor; an engine load sensor and an engine temperature; or an engine speed sensor, an engine load sensor and an engine temperature sensor. The intake manifold sensor 109 may be an intake manifold gas temperature sensor, an intake manifold gas pressure sensor or an intake manifold gas temperature sensor and an intake manifold gas pressure sensor. The exhaust manifold sensor 117 may be an exhaust manifold gas temperature sensor, an exhaust manifold gas pressure sensor or an exhaust manifold gas temperature sensor and an exhaust manifold gas pressure sensor. The EGR sensor 119 may be an EGR gas temperature sensor, an EGR gas flow rate sensor or an EGR gas temperature sensor and an EGR gas flow rate sensor. It should be appreciated that the plurality of sensors 101, 109, 111, 117, 119, 130, 132 provide electrical signals related to temperature, pressure, flow rate, RPMs, NOx content, etc., which are detected or monitored by a given sensor. Also, the plurality of sensors 101, 109, 111, 117, 119, 130, 132 transmit electric signals (sensor readings, data) to an engine control unit (ECU) 140 via communication path(s) 150, 152, 154 and/or 156. The communication paths 150, 152, 154, 156 may be wireless or wired communication paths.

The ECU 140 has one or more processors 141, one or more memory modules 142, and other components 143-146. Each of the one or more processors 141 may be a controller, an integrated circuit, a microchip, or any other computing device. The one or more memory modules 142 may be non-transitory computer-readable medium and be configured as RAM, ROM, flash memories, hard drives, and/or any device capable of storing computer-executable instructions such that the computer-executable instructions can be accessed by the one or more processors 141. The computer-executable instructions can comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into computer-executable instructions and stored on the one or more memory modules 142. Alternatively, the computer-executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more processors 141 can be coupled to the communication path(s) 150, 152, 154 and/or 156 that provide signal interconnectivity between various modules of the system 10. Accordingly, the communication path(s) 150, 152, 154 and/or 156 can communicatively couple any number of processors with one another, and allow the modules of the system 10 to operate in a distributed computing environment. Specifically, each of the modules can operate as a node that may send and/or receive data. As used herein, the term "communicatively coupled" means that coupled components are capable of exchanging data signals with one another such as, for example, electrical signals via conductive medium, over-the-air electromagnetic signals, optical signals via optical waveguides, and the like. Accordingly, the communication path(s) 150, 152, 154 and/or 156 can be formed from any medium that is capable of transmitting a signal such as, for example, conductive wires, conductive traces, optical waveguides, or the like. Moreover, the communication path(s) 150, 152, 154 and/or 156 can be formed from a combination of mediums capable of transmitting signals. In embodiments, the communication path(s) 150, 152, 154 and/or 156 may include a combination of conductive traces, conductive wires, connectors, and buses that cooperate to permit the transmission of electrical data signals to components such as processors, memories, sensors, input devices, output devices, and communication devices. Accordingly, the communication path(s) 150, 152, 154 and/ or 156 may include a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Upon operation, air flowing through the air intake, turbocharger 102 and intake manifold 108 is supplied to the individual cylinders 110, as is fuel through the fuel injectors 112. Upon combustion of the fuel and air in the cylinders 110, exhaust gas exits the cylinders 110 and enters into exhaust system 120 at inlet 122, flows through the exhaust pipe 121 and exits at outlet 124. At least a portion of the exhaust gas can be recirculated through the diesel ICE 100 via the EGR system 118. It should be appreciated that recirculation of exhaust gas through the diesel ICE 100 can reduce the amount of NO in exhaust gas that exits the exhaust manifold 116 and flows through the exhaust pipe 121. Exhaust gas that exits the exhaust manifold 116, enters the exhaust pipe 121 through inlet 122, flows past the first NOx sensor 130, through the DOC/DPF 126, through the SCR catalyst 128 and exits the exhaust pipe 121 via outlet 124. The first NOx sensor 130 provides a signal related to a quantity of NOx in the exhaust gas having exited the exhaust manifold 116 prior to reaching the DOC/DPF 126 and prior to any intentional oxidation of NO to $NO_2$. After flowing past the first NOx sensor 130, the exhaust gas flows though the DOC/DPF 126 where oxidation of NO to $NO_2$ occurs and the amount of NO in the exhaust decreases. After flowing through the DOC/DPF 126, the exhaust gas flows through the SCR catalyst 128. The reducing agent dosing system 127 provides a reducing agent to the SCR catalyst, which in turn reduces NO and $NO_2$ to $N_2$ and $H_2O$, and $CO_2$ if urea is included in the reducing agent. After passing through the SCR catalyst 128, the exhaust gas flows past the second NOx sensor 132 and exits the exhaust system 120 via outlet 124. Although FIG. 1 is described in terms of a diesel ICE combustion engine, it should be appreciated that the systems and disclosed and described herein may be used for other types of ICEs, e.g., a gasoline ICE, a dual fuel diesel/compressed natural gas (CNG) ICE, etc.

Referring to FIG. 2, in embodiments the internal combustion engine 100 with the plurality of sensors 109, 111, 117, 119 provide engine operating condition data (Sensor Output) via communication path 150 to the ECU 140, and particularly to the one or more memory modules 142. The engine operating condition data is provided as input data for the Gaussian process model which may be stored on one or more of the memory modules 142. The engine operating condition data may include intake manifold temperature data and/or intake manifold pressure data from the intake manifold sensor 109; exhaust manifold gas oxygen concentration data, exhaust manifold gas NOx concentration data, exhaust manifold gas temperature data, exhaust manifold pressure data and/or an exhaust manifold gas lambda data from the exhaust manifold sensor 117; and/or EGR gas temperature data and/or an EGR flow rate from the EGR sensor 119. It is appreciated that the term "lambda" (λ) refers to the air-fuel equivalence ratio, i.e., the ratio of the actual air-fuel ratio in the exhaust gas to the stoichiometric air-fuel ratio for a given air-fuel mixture. In embodiments, fuel injector operating condition data from the fuel injector sensor 111 may be provided as input data for the Gaussian process model. For example, a control parameter for one or more of the fuel injectors 112 from a previous combustion cycle or an average of a control parameter from a plurality of previous combustion cycles; a fuel injected quantity for one or more of the fuel injectors 112; an energizing time for one or more of the fuel injectors 112 during a fuel injection pulse, a fuel injection pressure for one or more of the fuel injectors 112; and/or a dwell time between two consecutive fuel injection pulses for one or more of the fuel injectors 112 may be provided to the ECU 140, and particularly to the one or more memory modules 142 where the Gaussian process model is stored. It should be appreciated that each of the fuel injectors 112 may have a fuel injector sensor 111 associated therewith or only a subset of the fuel injectors 112 may have a fuel injector sensor 111 associated therewith. It should also be appreciated that fuel injector operating condition data from a single fuel injector 112, all of the fuel injectors 112 or a subset of the fuel injectors 112 may be provided to the ECU 140.

The engine operating condition data is provided to the one or more memory modules 142 and the one or more processors 141 calculate $MFB50_{est}$ using the Gaussian process model using the engine operating condition data as input. An $MFB50_{desired}$ is obtained from a look-up table as a function of one or more engine operation parameters (EOPs) provide by the engine operating parameter sensor 101 to the ECU 140. Any engine operating parameter may be used to select $MFB50_{desired}$ from the look-up table, illustratively including engine speed, engine load, engine temperature, etc. Also more than one engine operating parameter may be used to select $MFB50_{desired}$. The $MFB50_{est}$ is compared with the $MFB50_{desired}$ using one or more of the processors 141 and the control parameter for one or more of the fuel injectors 112 is commanded by the ECU 140 as a function of the difference between the $MFB50_{est}$ and $MFB50_{desired}$. For example, if the difference between the $MFB50_{est}$ and $MFB50_{desired}$ is within a given predefined tolerance and is a positive value, then the SOI for one or more of the fuel injectors 112 is retarded. If the difference between the $MFB50_{est}$ and $MFB50_{desired}$ is within a given predefined tolerance and is a negative value, then the SOI for one or more of the fuel injectors 112 is advanced. If the difference between the $MFB50_{est}$ and $MFB50_{desired}$ is outside a given predefined tolerance, the SOI and the rail pressure or number of injection events for one or more of the fuel injectors may be varied. The Gaussian process model is a statistical model with observations occurring in a continuous domain such as time or space. Every data point in the Gaussian process model is associated with a normally distributed random variable with a finite collection of these random variables having a multivariate normal distribution. The distribution of the Gaussian process model is a joint distribution of the random variables, and as such, is a distribution over functions with a continuous domain such as time or space. In embodiments, the Gaussian process model is in the form of x=GP(m(x), k(x,x')) where m(x) is a mean function and k(x,x') is a covariance function. A Bayesian interference model may be selected to maximize the likelihood of represented data and a linear combination of observed outputs of the Gaussian process model forms a model prediction, e.g., an $MFB50_{est}$. By using the Gaussian process model with the systems and methods disclosed and described herein, a strong correlation between the $MFB50_{est}$ and the $MFB50_{desired}$ is obtained in a non-intrusive manner, i.e., without the use of pressure data from within any of the cylinders 110 of the ICE 100. Accordingly, the calculation of $MFB50_{est}$, selection of $MFB50_{desired}$ from the look-up table, comparison of the $MFB50_{est}$ with the $MFB50_{desired}$ and the command of the control parameter for one or more of the fuel injectors 112 is decoupled from the thermodynamic process occurring within the cylinders 110 during operation of the ICE 100. In order to better explain the systems and methods disclosed and described herein and yet not limit the scope of the application in any manner, one or more examples are described below.

Examples

Figure 3:
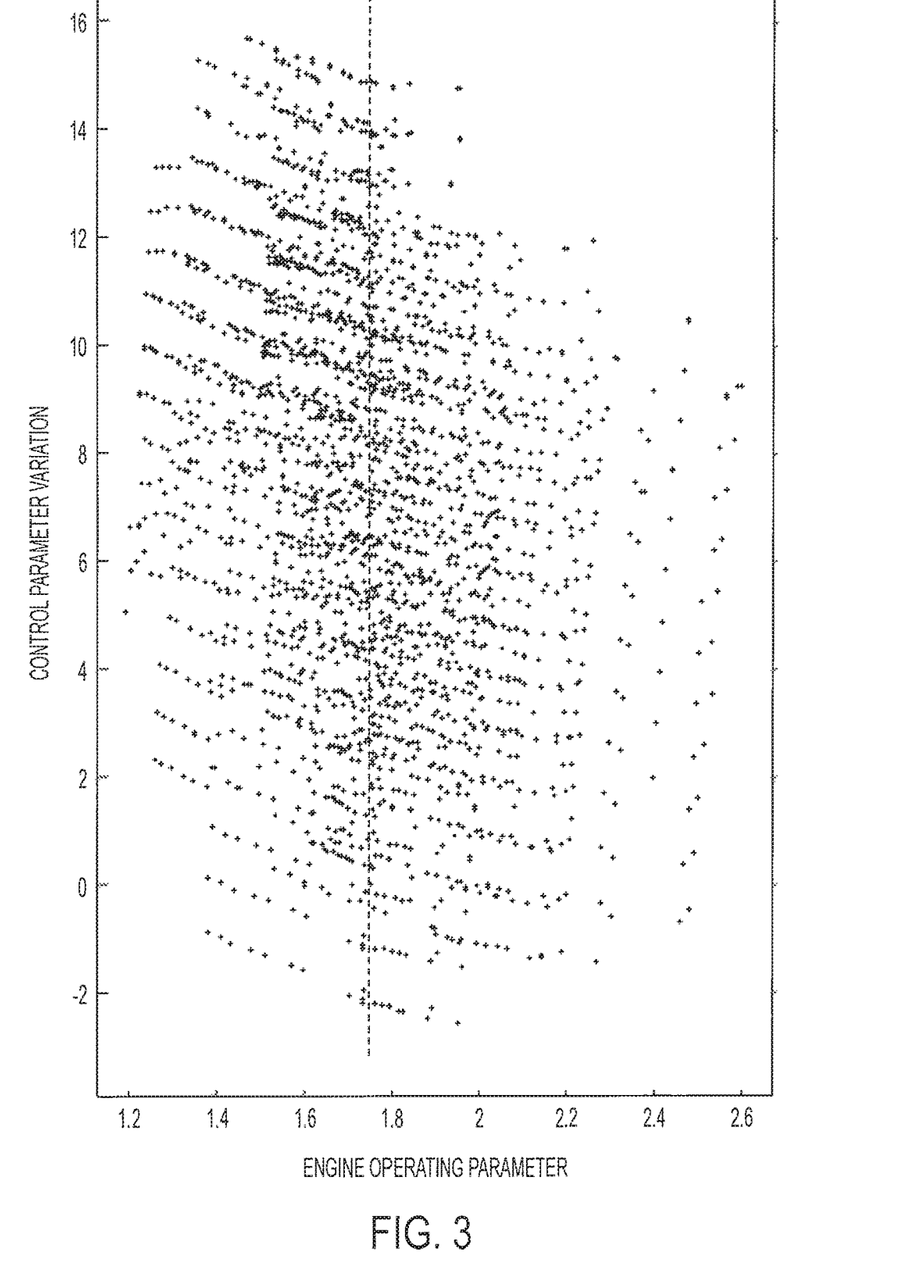
FIG. 3 graphically depicts a space filling model data set used for a system and method according to one or more embodiments disclosed and described herein.

With reference to FIGS. 3-7, a non-intrusive closed-loop combustion control system was developed for an ICE. The development of the system included obtaining engine operating condition data for four different engine operating conditions at nine different engine speed-torque combinations. The four different engine operating conditions were intake manifold gas temperature ($T_{intake}$), intake manifold gas pressure ($P_{intake}$), exhaust manifold gas temperature ($T_{exhaust}$) and exhaust manifold gas lambda ($\lambda_{exhaust}$). The nine different engine speed-torque combinations were obtained from three different engine speeds (rpm) and three different torques (Nm) at each engine speed. A total of 2,282 data points was obtained for each engine operating condition at each engine speed-torque setting. The control parameters 50I, rail pressure, and percent of EGR were varied at each of the nine different operating points and resulted in a space filling model as shown in FIG. 3 for one of the engine operating conditions. The data obtained for the remaining engine operating conditions also resulted in a space filling model (not shown). Data from engine operating conditions was provided as input to the Gaussian process model. The Gaussian process model used the data from the engine operating conditions to calculate $MFB50_{est}$ values. In order to compare the calculated $MFB50_{est}$ values with actual MFB50 values, an in-cylinder sensor was used to measure MFB50 values (labeled as "$MFB50_{meas}$" in the figures). Each $MFB50_{est}$ value-$MFB50_{meas}$ value pair created a data point that was plotted on an $MFB50_{est}$ (x-axis) versus $MFB50_{meas}$ (y-axis) graph. The same 2,282 data points obtained for each engine operating condition at each engine speed-torque setting data were used as input for a polynomial process model of the fourth order that also generated $MFB50_{est}$ values, and the MFB50est values calculated by the fourth order polynomial process model were plotted versus the $MFB50_{meas}$ values. Correlations between $MFB50_{est}$ and $MFB50_{meas}$ obtained by the Gaussian process model and the fourth order polynomial process model were compared as described and discussed below.

The coefficient of determination, also referred to as R-squared ($R^2$), was used to provide a measure of how close the $MFB50_{est}$-$MFB50_{meas}$ data fell with respect to a fitted regression line. It should be appreciated values of $R^2$ between 0 and 0.5 illustrate that a given model is not suitable for reliable predictions, $R^2$ values between 0.6 and 0.9 demonstrate a given model is suitable for qualitative predictions, and $R^2$ values between 0.9 and 1.0 demonstrate that a given model is suitable for quantitative predictions. The root mean square error (RMSE) was also used to measure the difference between $MFB50_{est}$ values predicted by the Gaussian process model and $MFB50_{meas}$ values predicted by the fourth order polynomial model. The RMSE is useful to compare different process models that have the same or similar data input and that low RMSE values discussed below depict low variance and bias between $MFB50_{est}$ values and the $MFB50_{meas}$ values.

Figure 4:
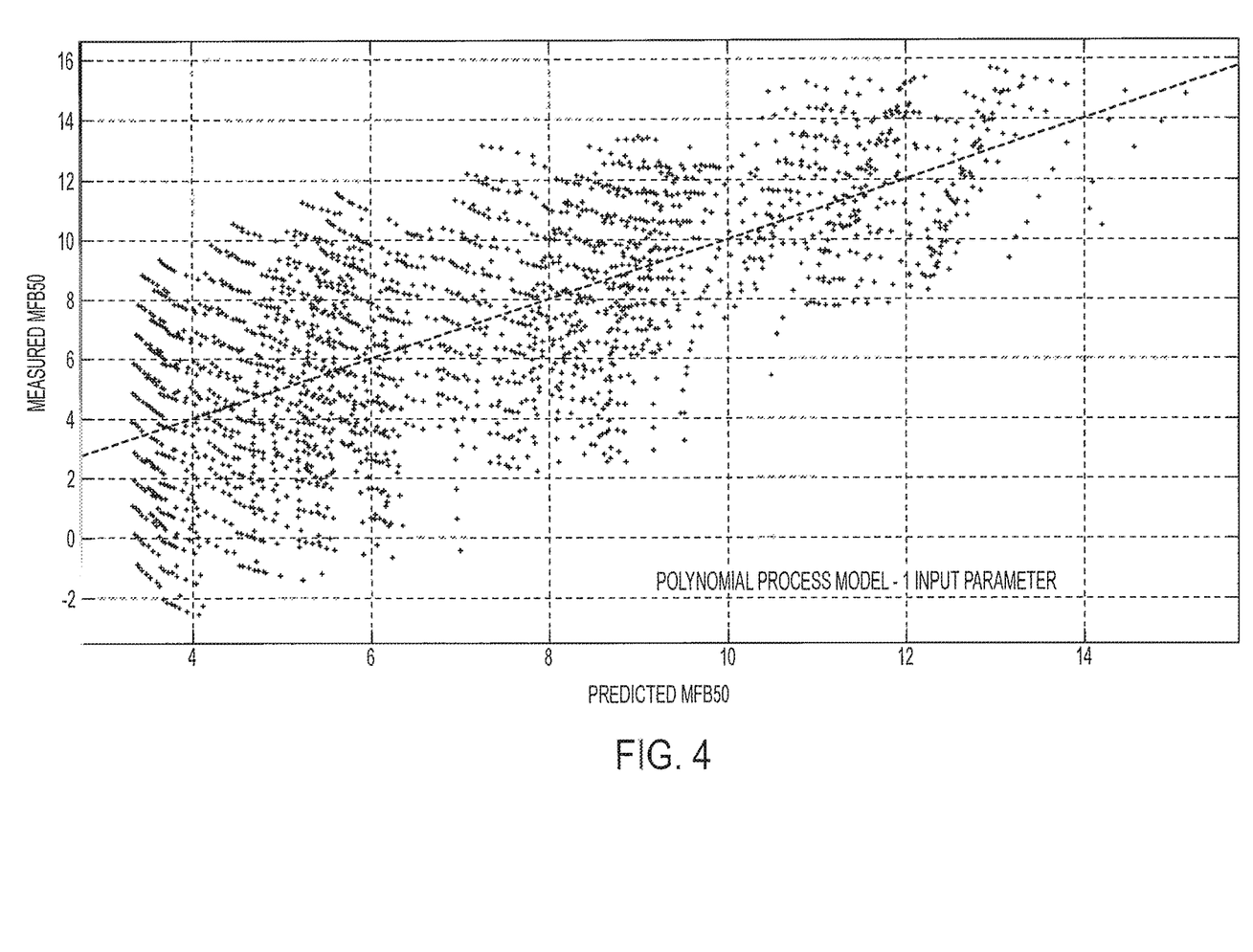
FIG. 4 graphically depicts a correlation between measured MFB50 and predicted MFB50 using a polynomial process model with a single input parameter.
Figure 5:
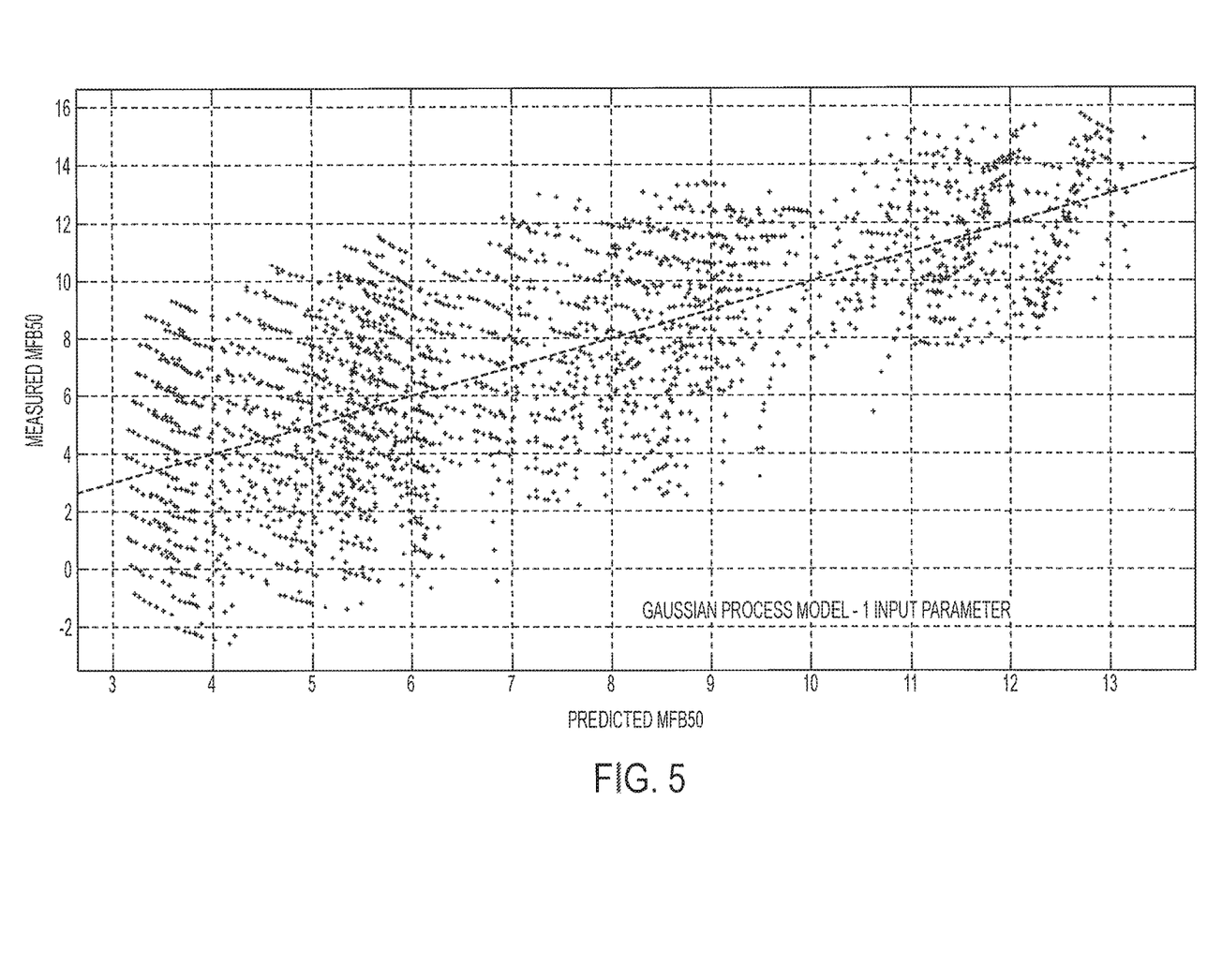
FIG. 5 graphically depicts measured MFB50 versus predicted MFB50 for a Gaussian process model with a single input parameter according to one or more embodiments disclosed and described herein.

Referring now to FIGS. 4 and 5, a comparison of the fourth order polynomial process model and the Gaussian process model using a single engine operating condition for input data is shown. Particularly, FIG. 4 graphically depicts a plot of $MFB50_{est}$-$MFB50_{meas}$ data with respect to a regression line with a slope of 1 for the single engine operating condition $P_{intake}$ used as input for the fourth order polynomial process model, i.e., the fourth order polynomial process model calculated $MFB50_{est}$ values used in FIG. 4. FIG. 5 graphically depicts a plot of $MFB50_{est}$-$MFB50_{meas}$ data with respect to regression line with a slope of 1 when the same input data ($P_{intake}$) used to generate FIG. 4 was used as input for the Gaussian process model, i.e. the Gaussian process model calculated $MFB50_{est}$ values used in FIG. 5. The $R^2$ for the data shown in FIG. 4 is 0.5 and the $R^2$ for the data shown in FIG. 5 is also 0.5. Accordingly, FIGS. 4 and 5 illustrate that neither the fourth order polynomial process model nor the Gaussian process model are suitable for quantitatively predicting MFB50 when data from a single engine operating condition is used as input.

Figure 6:
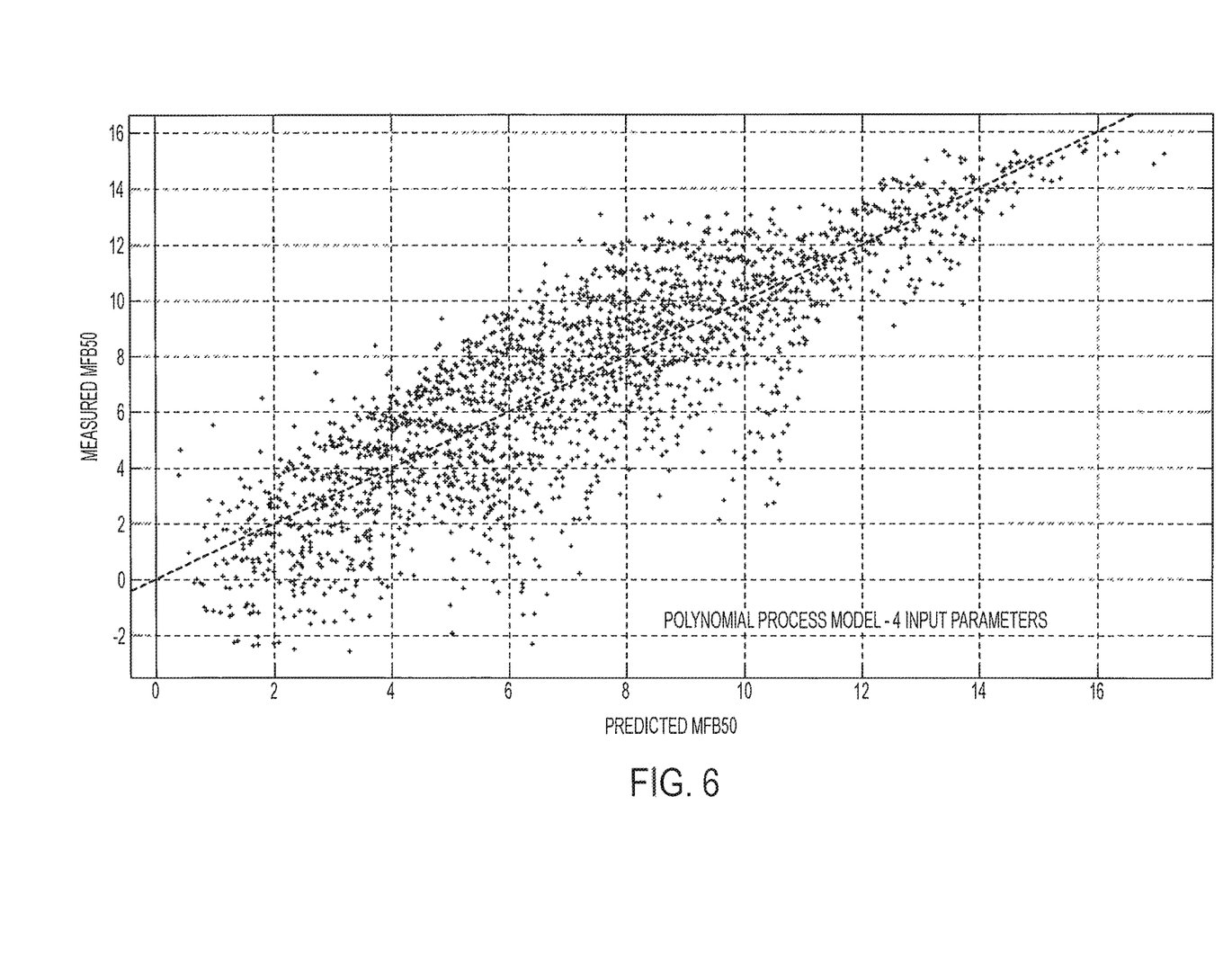
FIG. 6 graphically depicts measured MFB50 versus predicted MFB50 for a polynomial process model with four input parameters.
Figure 7:
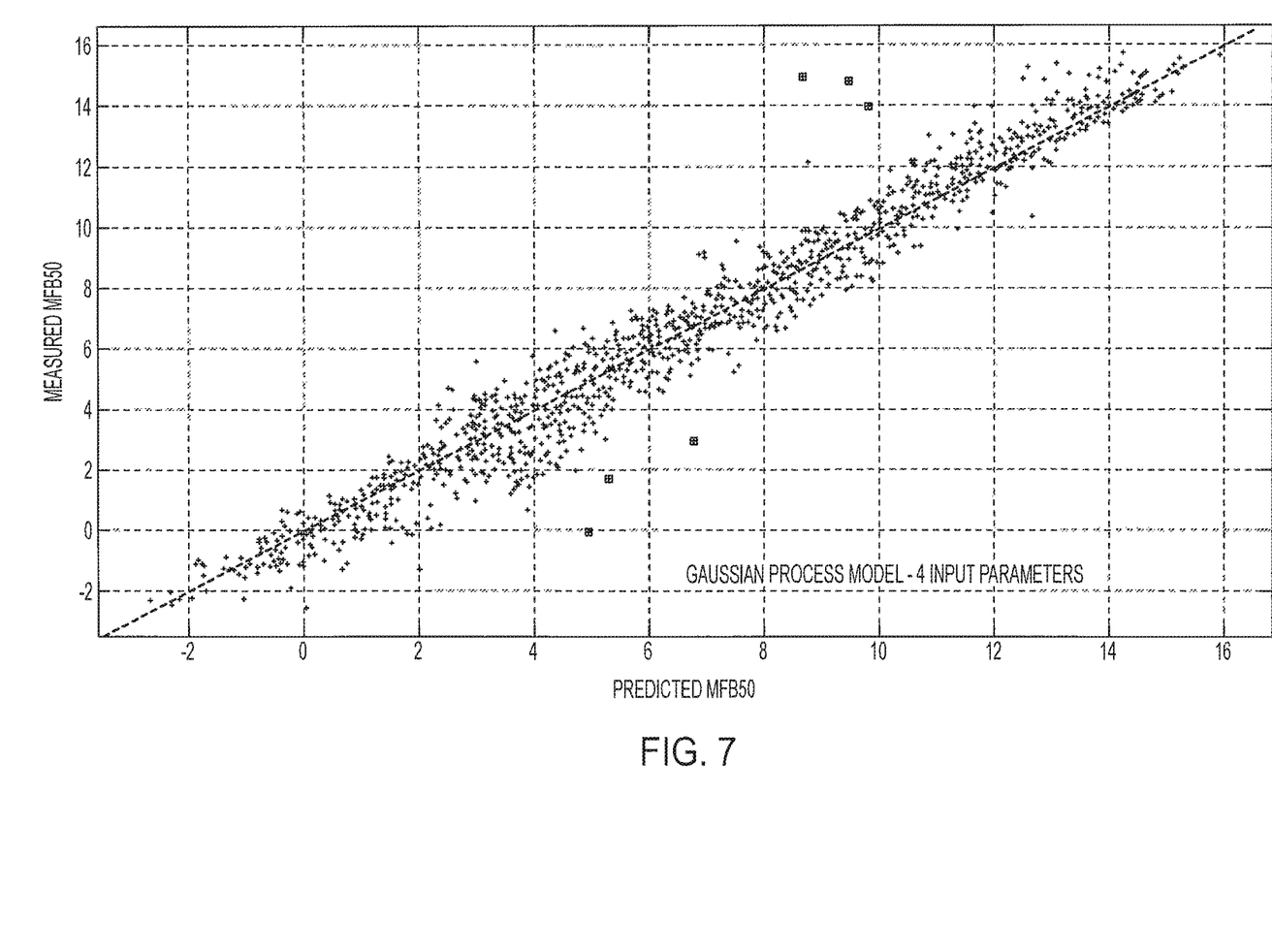
FIG. 7 graphically depicts measured MFB50 versus predicted MFB50 for a Gaussian process model with four input parameters according to one or more embodiments disclosed and described herein.

Referring now to FIGS. 6 and 7, a comparison of the fourth order polynomial model and the Gaussian process model using four engine operating conditions for input data is shown. Particularly, FIG. 6 graphically depicts a plot of $MFB50_{est}$-$MFB50_{meas}$ data with respect to a regression line with a slope of 1 when data from the four engine operating conditions $T_{intake}$, $P_{intake}$, $T_{exhaust}$, and $\lambda_{exhaust}$ were used for input to the fourth order polynomial process model. FIG. 7 graphically depicts a plot of $MFB50_{est}$-$MFB50_{meas}$ data with respect to regression line with a slope of 1 when the same input data ($T_{intake}$, $P_{intake}$, $T_{exhaust}$, $\lambda_{exhaust}$) used to generate FIG. 6 from the fourth order polynomial process model was used for input to the Gaussian process model. The R for the data shown in FIG. 6 is 0.73 and the $R^2$ for the data shown in FIG. 7 is also 0.98. Although there was improvement in the correlation between $MFB50_{est}$ and $MFB50_{meas}$ provided by the fourth order polynomial model when data from four engine operating conditions were provided as input, with an $R^2$ equal to 0.73, it should be appreciated that the polynomial model is not suitable for quantitative predictions. In contrast, with an $R^2$ equal to 0.98, it should be appreciated that the Gaussian process model with input data from four engine operating conditions is suitable for and performs very well in providing quantitative predictions, i.e. the Gaussian process model may be used to estimate a MFB50 with acceptable certainty. It should also be appreciated that the difference in $R^2$ between the fourth order polynomial model and the Gaussian process model (0.73 versus 0.98) is an unexpected result, i.e., the Gaussian process model provides an unexpected improvement in the correlation between $MFB50_{est}$ and $MFB50_{meas}$.

The RMSE of the fourth order polynomial model and the Gaussian process model also provide evidence of the ability or lack thereof to provide quantitative predictions. Particularly, the RMSEs for the data shown in FIGS. 4, 5, 6, and 7 were 2.71, 2.70, 2.01 and 0.58 respectively. That is, the RMSE for the correlation between $MFB50_{est}$ and $MFB50_{meas}$ provided by fourth order polynomial process model decreased from 2.71 when data from only one engine operating condition ($P_{intake}$) were used as input to 2.01 when data from the four engine operating conditions ($T_{intake}$, $P_{intake}$, $T_{exhaust}$, $\lambda_{exhaust}$) were used as input. In contrast, the RMSE for the correlation between $MFB50_{est}$ and $MFB50_{meas}$ provided by Gaussian process model decreased from 2.70 when data from only one engine operating condition ($P_{intake}$) were used as input to 0.58 when data from the four engine operating conditions ($T_{intake}$, $P_{intake}$, $T_{exhaust}$, $\lambda_{exhaust}$) were used as input. It should be appreciated that the difference in RMSE between the fourth order polynomial model and the Gaussian process model (2.01 versus 0.58) is an unexpected result, i.e., the Gaussian process model provides an unexpected improvement in the correlation between $MFB50_{est}$ and $MFB50_{meas}$.

Accordingly, the systems and methods disclosed and described herein provide for non-intrusive closed-looped combustion control of ICEs. Particularly, the systems and methods disclosed and described herein provide for $MFB50_{est}$ values with acceptable certainty and/or accuracy without the use of an in-cylinder sensor and/or an in-cylinder sensor measurement. The $MFB50_{est}$ values may be compared to $MFB50_{desired}$ values obtained from an empirically determined look-up table and the comparison of the $MFB50_{est}$ and $MFB50_{desired}$ values may be used to command a control parameter for one or more fuel injectors associated with one or more cylinders of an ICE. Accurately calculating $MFB50_{est}$ with the Gaussian process model and commanding a control parameter for the one or more fuel injectors as a function of the $MFB50_{est}$ provides for improved fuel efficiency and reduced exhaust gas NOx emissions during general steady state operation of an ICE. Although the above examples and discussion are in terms of estimating MFB50, it should be appreciated that the systems and methods disclosed and described herein may be used to estimate other combustion parameters illustratively including crank angle for start of combustion, crank angle of peak pressure, and indicated mean effective pressure.

It will apparent to those skilled in the art that various modifications and variations can be made to the embodiments described herein without departing from the spirit and scope. Thus it is intended that the embodiments described herein cover any modifications and variations provided they come within the scope of the appended claims and their equivalents.

We claim:

1. A closed-loop control system for an internal combustion engine comprising:
an internal combustion engine with a plurality of cylinders;
an intake manifold sensor configured to sense an intake manifold temperature data of the internal combustion engine;
a fuel injector sensor configured to sense a fuel injector operating condition data of the internal combustion engine;
an exhaust manifold sensor configured to sense an exhaust manifold gas oxygen concentration data of the internal combustion engine;
an exhaust gas recirculation (EGR) sensor configured to sense an EGR gas temperature data of the internal combustion engine;
the intake manifold sensor, the fuel injector sensor, the exhaust manifold sensor, and the EGR sensor are decoupled from the plurality of cylinders of the internal combustion engine;
an electronic control unit (ECU) with one or more processors and a non-transitory computer-readable medium storing computer-executable instructions, the computer-executable instructions comprising a Gaussian process model, the ECU configured to receive data from the intake manifold sensor, the fuel injector sensor, the exhaust manifold sensor, and the EGR sensor;
wherein the ECU is configured to estimate a combustion parameter of the internal combustion engine using the Gaussian process model with the data from the intake manifold sensor, the fuel injector sensor, the exhaust manifold sensor, and the EGR sensor as input to the Gaussian process model, compare the $MFB50_{est}$ with a desired combustion parameter obtained from an empirically determined look-up table, and command a control parameter for a fuel injector for each the plurality of cylinders of the internal combustion engine as a function of the comparison of the estimated combustion parameter with the desired combustion parameter.

2. The closed-loop control system of claim 1, wherein the intake manifold sensor is further configured to sense an intake manifold pressure data, the exhaust manifold sensor is further configured to sense an exhaust manifold gas NOx concentration data, an exhaust manifold gas temperature data, an exhaust manifold pressure data and an exhaust manifold gas lambda data of the internal combustion engine, and the EGR sensor is further configured to sense an EGR flow rate of the internal combustion engine.

3. The closed-loop control system of claim 1, wherein the fuel injector operating condition data further comprises at least one of a start of injection (SOI) from a previous combustion cycle, a fuel injected quantity, an energizing time of a fuel injector during a fuel injection pulse, a fuel injection pressure and a dwell time between two consecutive fuel injection pulses.

4. The closed-loop control system of claim 3, wherein the combustion parameter is selected from the group consisting of MFB50, crank angle for start of combustion, crank angle for peak pressure, and indicated mean effective pressure.

5. The closed-loop control system of claim 3, wherein the combustion parameter is MFB50, the estimated combustion parameter is $MFB50_{est}$ and the desired combustion parameter is $MFB50_{desired}$.

6. The closed-loop control system of claim 5, wherein the comparison of the $MFB50_{est}$ with the $MFB50_{desired}$ is decoupled from any sensor measurement from within the plurality of cylinders.

7. The closed-loop control system of claim 4, wherein the internal combustion engine is void of an in-cylinder pressure sensor.

8. The closed-loop control system of claim 5, wherein the $M50_{desired}$ obtained from the empirically determined look-up table is a function of at least one of an internal combustion engine speed, an internal combustion engine load and an internal combustion engine temperature.

9. The closed-loop control system of claim 1, wherein the control parameter for the fuel injector for each the plurality of cylinders is one or more of a start of injection (SOI), rail pressure and number of injection events for a current combustion cycle.

10. A method for controlling fuel injection of an internal combustion engine comprising:
    operating an internal combustion engine, the internal combustion engine having an intake manifold, a plurality of cylinders, a fuel injector for each cylinder, an exhaust manifold, an intake manifold sensor configured to sense an intake manifold temperature data of the internal combustion engine, a fuel injector sensor configured to sense a fuel injector operating condition data of the internal combustion engine, an exhaust manifold sensor configured to sense an exhaust manifold gas oxygen concentration data of the internal combustion engine, an exhaust gas recirculation (EGR) sensor configured to sense an EGR gas temperature data of the internal combustion engine, and an electronic control unit (ECU) with one or more processors and a non-transitory computer-readable medium storing computer-executable instructions, the computer-executable instructions comprising a Gaussian process model, the ECU configured to receive data from the intake manifold sensor, the fuel injector sensor, the exhaust manifold sensor, and the EGR sensor;
    obtaining the data from the intake manifold temperature sensor, the fuel injector sensor, the exhaust manifold sensor, and the EGR sensor and transmitting the data to the ECU;
    estimating a combustion parameter value of the internal combustion engine using the Gaussian process model with the data from the intake manifold temperature sensor, the fuel injector sensor, the exhaust manifold sensor, and the EGR sensor as input to the Gaussian process model;
    obtaining a desired combustion parameter value from an empirically determined look-up table;
    comparing the estimated combustion parameter value with the desired combustion parameter value; and
    commanding a control parameter for the fuel injector of each cylinder as a function of the comparison of the estimated combustion parameter value and the desired combustion parameter value.

11. The method of claim 10, wherein the intake manifold sensor is further configured to sense an intake manifold pressure data, the exhaust manifold sensor is further configured to sense an exhaust manifold gas NOx concentration data, an exhaust manifold gas temperature data, an exhaust manifold pressure data and an exhaust manifold gas lambda data of the internal combustion engine, and the EGR sensor is further configured to sense an EGR flow rate of the internal combustion engine.

12. The method of claim 10, wherein the fuel injector operating condition data further comprises at least one of SOI from a previous combustion cycle, a fuel injected quantity, an energizing time of a fuel injector during a fuel injection pulse, a fuel injection pressure and a dwell time between two consecutive fuel injection pulses.

13. The method of claim 12, wherein the combustion parameter value is selected from the group consisting of MFB50, crank angle for start of combustion, crank angle for peak pressure, and indicated mean effective pressure.

14. The method of claim 13, wherein the combustion parameter value is MFB50, the estimated combustion parameter value is $MFB50_{est}$ and the desired combustion parameter value is $MFB50_{desired}$.

15. The method of claim 14, wherein the comparison of the $MFB50_{est}$ with the $MFB50_{desired}$ is decoupled from any sensor measurement from within the plurality of cylinders.

16. The method of claim 14, wherein the $MFB50_{desired}$ obtained from the empirically determined look-up table is a function of at least one of an internal combustion engine speed, an internal combustion engine load and an internal combustion engine.

17. The method of claim 10, wherein the internal combustion engine is void of an in-cylinder pressure sensor.

18. The method of claim 10, wherein the control parameter for the fuel injector of each cylinder is one or more of a start of injection, rail pressure and number of injection events for a current combustion cycle.

* * * * *